(12) United States Patent
Yamagata

(10) Patent No.: US 10,843,460 B2
(45) Date of Patent: Nov. 24, 2020

(54) LIQUID EJECTION HEAD, LIQUID EJECTION DEVICE, AND LIQUID EJECTION METHOD

(71) Applicant: SEIKO EPSON CORPORATION, Tokyo (JP)

(72) Inventor: Toshiyuki Yamagata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/715,197

(22) Filed: Dec. 16, 2019

(65) Prior Publication Data
US 2020/0198328 A1    Jun. 25, 2020

(30) Foreign Application Priority Data
Dec. 19, 2018   (JP) ................................ 2018-237332

(51) Int. Cl.
| | |
|---|---|
| *B41J 2/045* | (2006.01) |
| *C09D 11/322* | (2014.01) |
| *B41J 2/21* | (2006.01) |
| *B41J 2/15* | (2006.01) |

(52) U.S. Cl.
CPC ....... *B41J 2/04541* (2013.01); *B41J 2/04581* (2013.01); *B41J 2/04588* (2013.01); *B41J 2/211* (2013.01); *C09D 11/322* (2013.01); *B41J 2/15* (2013.01)

(58) Field of Classification Search
CPC ................ B41J 2/04541; B41J 2/04581; B41J 2/04588; B41J 2/211; C09D 2/11; C09D 11/322
See application file for complete search history.

(56) References Cited

U.S. PATENT DOCUMENTS

| | | | |
|---|---|---|---|
| 2010/0143593 A1 | 6/2010 | Sano et al. | |
| 2014/0232788 A1 | 8/2014 | Ohashi et al. | |
| 2017/0114236 A1* | 4/2017 | Sagara et al. | ........ C09D 11/322 |

FOREIGN PATENT DOCUMENTS

| | | |
|---|---|---|
| JP | 2015093467 | 5/2015 |
| JP | 2016052786 | 4/2016 |
| JP | 2017159648 | 9/2017 |

\* cited by examiner

*Primary Examiner* — Juanita D Jackson
(74) *Attorney, Agent, or Firm* — Workman Nydegger

(57) ABSTRACT

A liquid ejection head configured to eject a liquid through nozzles includes plural head sections including a first head section and a second head section. Each of the plurality of head sections includes plural nozzle rows. One of the plural nozzle rows of the first head section is supplied with an undercoat-forming liquid containing an undercoat-forming pigment with an average particle diameter of at least 200 nm at a concentration of at least 7 percent by mass. Each of the plural nozzle rows of the second head section is supplied with an image-forming liquid containing an image-forming pigment with an average particle diameter of less than 200 nm at a concentration of less than 7 percent by mass.

8 Claims, 8 Drawing Sheets

LIQUID EJECTION HEAD, LIQUID EJECTION DEVICE, AND LIQUID EJECTION METHOD

The present application is based on, and claims priority from JP Application Serial Number 2018-237332, filed Dec. 19, 2018, the disclosure of which is hereby incorporated by reference herein in its entirety.

BACKGROUND

1. Technical Field

The present disclosure relates to a liquid ejection head.

2. Related Art

Known liquid ejection heads eject liquids of plural colors onto a recording medium such as white paper using an ink jet method. Such liquid ejection heads are sometimes employed with non-white recording media such as plastic products or metal products. When employing such non-white recording media, color printing is for example performed by ejecting ink of a single color such as white ink to form an undercoat layer, and then ejecting various colored inks onto the undercoat layer.

JP-A-2016-52786 is an example of the related art.

Unlike color printing, the undercoat layer is for example a region formed by printing a solid block of a single color. Thus, in order to increase productivity, an ejection rate of the ink employed for the undercoat layer per unit time tends to be greater than an ejection rate of the various colored inks employed in color printing. This is achieved by for example ejecting a single colored ink through plural nozzle rows at the same time. However, when the ejection rate is increased, an issue arises in that adhesion of ink to a nozzle surface of the liquid ejection head increases due to an increase in the amount of ink mist occurring between the head and the recording medium.

SUMMARY

An aspect of the present disclosure provides a liquid ejection head configured to eject a liquid through nozzles. The liquid ejection head includes plural head sections each including plural nozzle rows. One of the plural nozzle rows of a first head section of the plural head sections is supplied with an undercoat-forming liquid containing an undercoat-forming pigment with an average particle diameter of at least 200 nm at a concentration of at least 7 percent by mass, and each of the plural nozzle rows of a second head section different from the first head section of the plural head sections is supplied with an image-forming liquid containing an image-forming pigment with an average particle diameter of less than 200 nm at a concentration of less than 7 percent by mass.

DESCRIPTION OF EXEMPLARY EMBODIMENTS

A. First Embodiment

Figure 1:
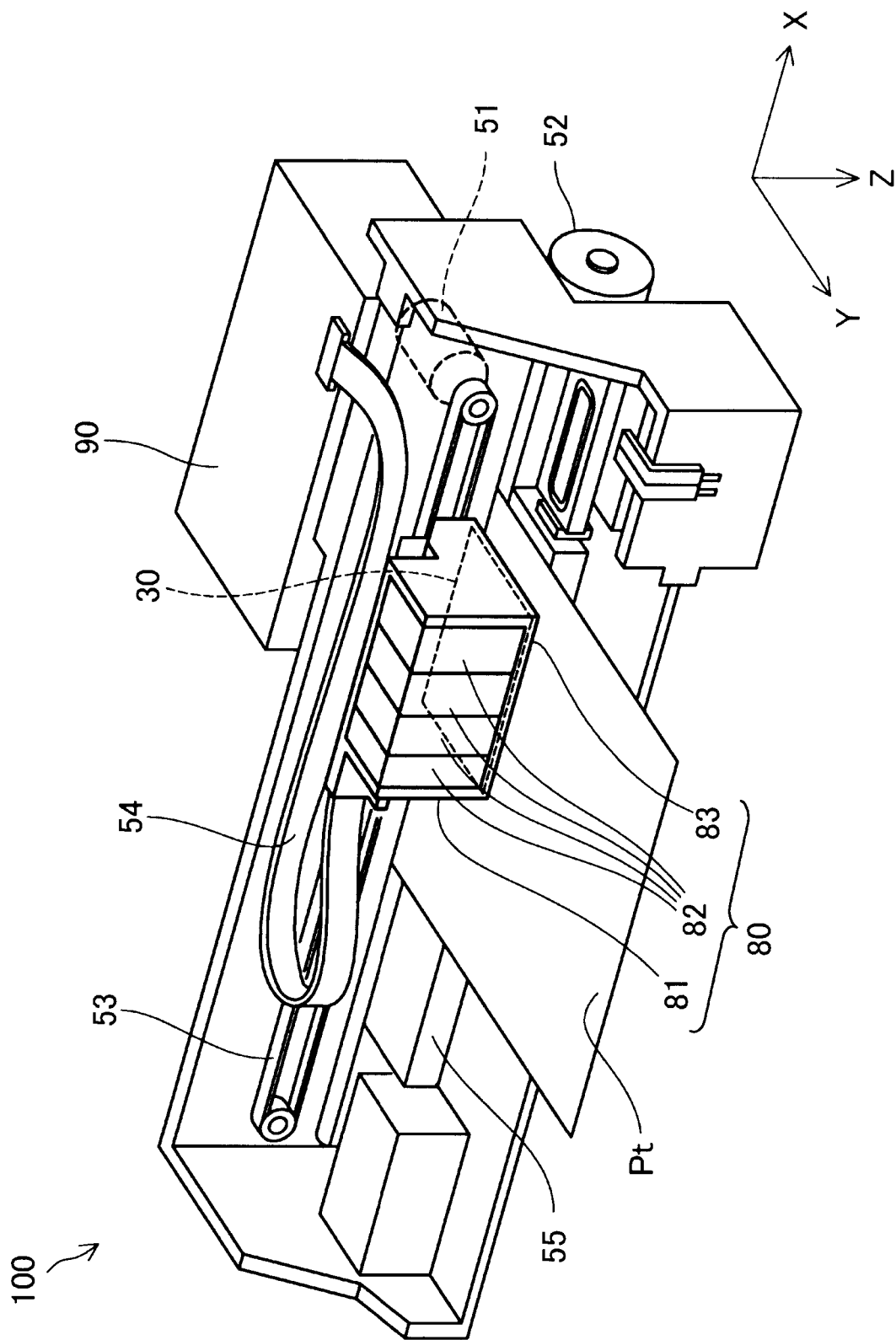
FIG. 1 is a simple configuration diagram of a printing device.

FIG. 1 is a simple configuration diagram of a printing device 100. The printing device 100 is what is referred to as a serial ink jet printer, and serves as an example of a liquid ejection device. The printing device 100 includes a head unit 80, a carriage motor 51, a transportation motor 52, a drive belt 53, a flexible cable 54, a platen 55, and a control section 90. The printing device 100 prints by ejecting liquid ink onto a recording medium Pt to form dots based on print data input from an image forming device. In the present embodiment, a non-white recording medium such as a plastic sheet or a thin metal sheet is employed as the recording medium Pt. The printing device 100 prints by switching between a first mode in which ink is ejected onto the recording medium Pt to form an undercoat layer, and a second mode in which an image is formed on the surface of the undercoat layer. FIG. 1 illustrates an X direction, a Y direction, and a Z direction. The X direction is a direction running along a main scanning direction, this being a width direction of the recording medium Pt, and the Y direction is a direction running along a sub-scanning direction, this being a transportation direction of the recording medium Pt. The Z direction is a direction running along the direction of gravity, and is an ejection direction of ink from a liquid ejection head 83 in the present embodiment.

The head unit 80 serves as an ink ejection device of the printing device 100, and is configured by a carriage 81, ink cartridges 82, and the liquid ejection head 83. The head unit 80 is electrically coupled to the control section 90 through the flexible cable 54. The head unit 80 is attached to a non-illustrated carriage guide, and is moved back and forth along the X direction that is the main scanning direction by drive force of the carriage motor 51 transmitted through the drive belt 53.

The plural ink cartridges 82 corresponding to each ink color are loaded into the carriage 81. In the present embodiment, eight types of ink cartridge 82 are provided. Cyan (Cy), magenta (Ma), yellow (Ye), black (Bk), light cyan (Lc), and light magenta (Lm) configure six of the eight types. These six types are collectively referred to as image-forming inks. Of the two remaining types, one is white ink (Wt), and the other is transparent ink (Op). In the present embodiment, the white ink is an undercoat-forming ink employed to form a region of a solid block of color on the recording medium Pt as an undercoat layer. The transparent ink is a colorless transparent ink employed to adjust the luster of a printed image. The transparent ink may also be used for treatment prior to printing with the image-forming inks. Various white inks, such as a pearl white ink that adds a metallic luster, may be employed as the white ink.

The liquid ejection head 83 includes a print head set 30 on a face opposing the recording medium Pt. The liquid ejection head 83 is coupled to the carriage 81, and ejects ink toward the recording medium Pt through plural nozzles provided to the print head set 30 while moving back and forth along the X direction. Raster lines configured by rows of dots along the X direction are thereby formed. The print head set 30 is explained in detail later.

The transportation motor 52 is driven in response to a control signal from the control section 90. Non-illustrated transportation rollers are rotated by drive force from the transportation motor 52 to transport the recording medium Pt over the platen 55 along the Y direction that is the sub-scanning direction. In the present embodiment, the sub-scanning direction is orthogonal to the main scanning direction; however, the sub-scanning direction is not limited to being orthogonal, and may intersect the main scanning direction at any desired angle.

The control section 90 is configured by memory and a CPU, and executes overall control of the printing device 100. The control section 90 exchanges data with the image forming device through a non-illustrated interface, and outputs a drive signal to the liquid ejection head 83. Ink is ejected through the nozzles provided to the liquid ejection head 83 based on this drive signal. When print data is output from the image forming device, the control section 90 drives the carriage motor 51 to move the head unit 80 back and forth along the X direction. The control section 90 prints an image on the recording medium Pt by repeatedly alternating between control to eject ink onto the recording medium Pt using the liquid ejection head 83 and control to transport the recording medium Pt along the Y direction using the transportation motor 52.

Figure 2:
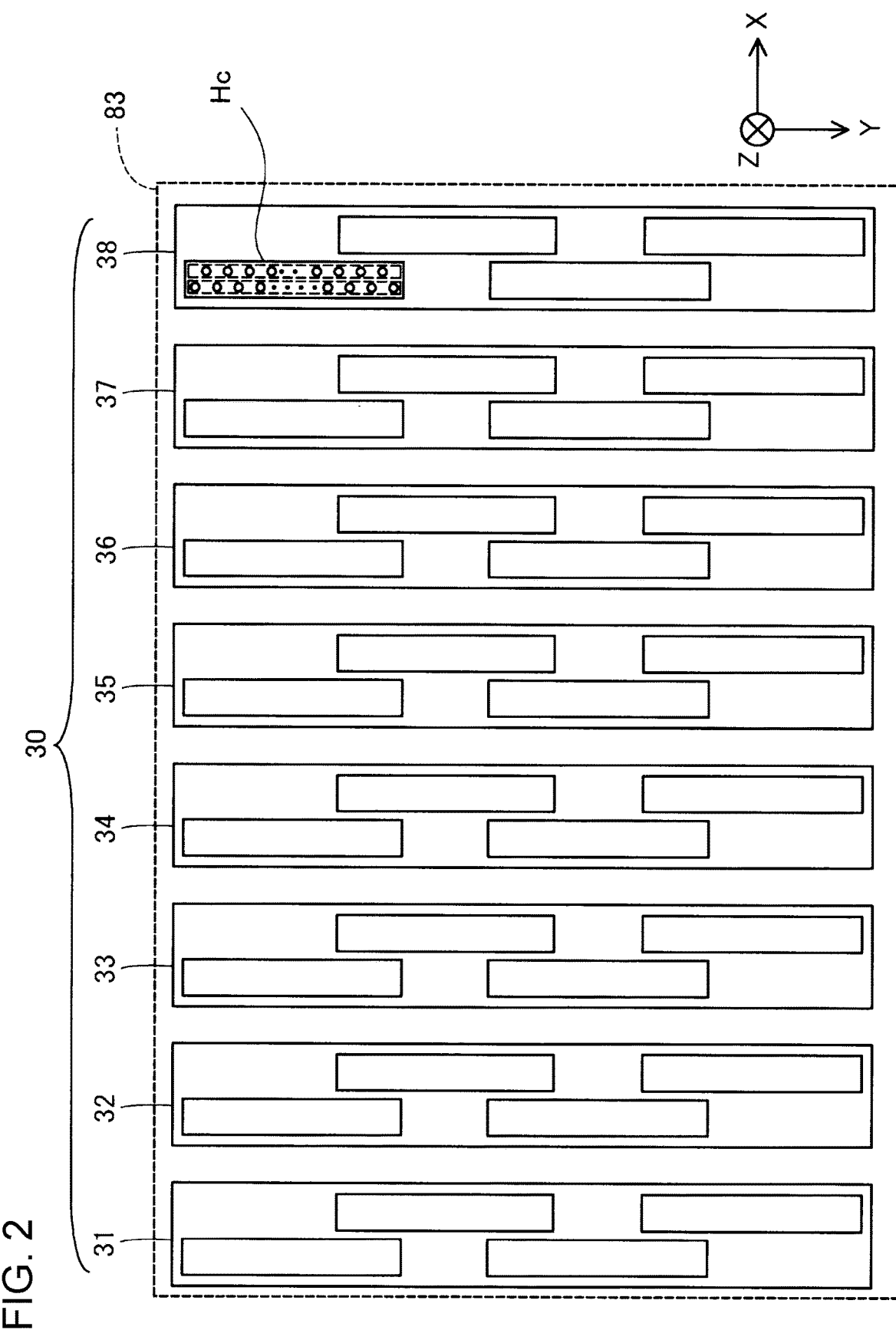
FIG. 2 is a plan view schematically illustrating a print head set provided to a liquid ejection head.
Figure 3:
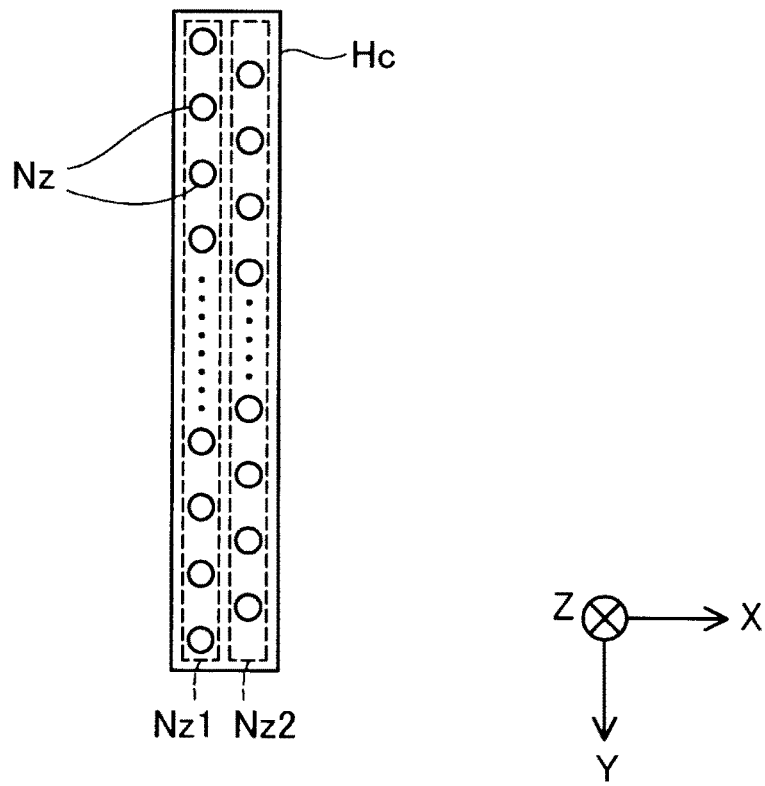
FIG. 3 is an explanatory diagram illustrating configuration of a single head chip.
Figure 4:
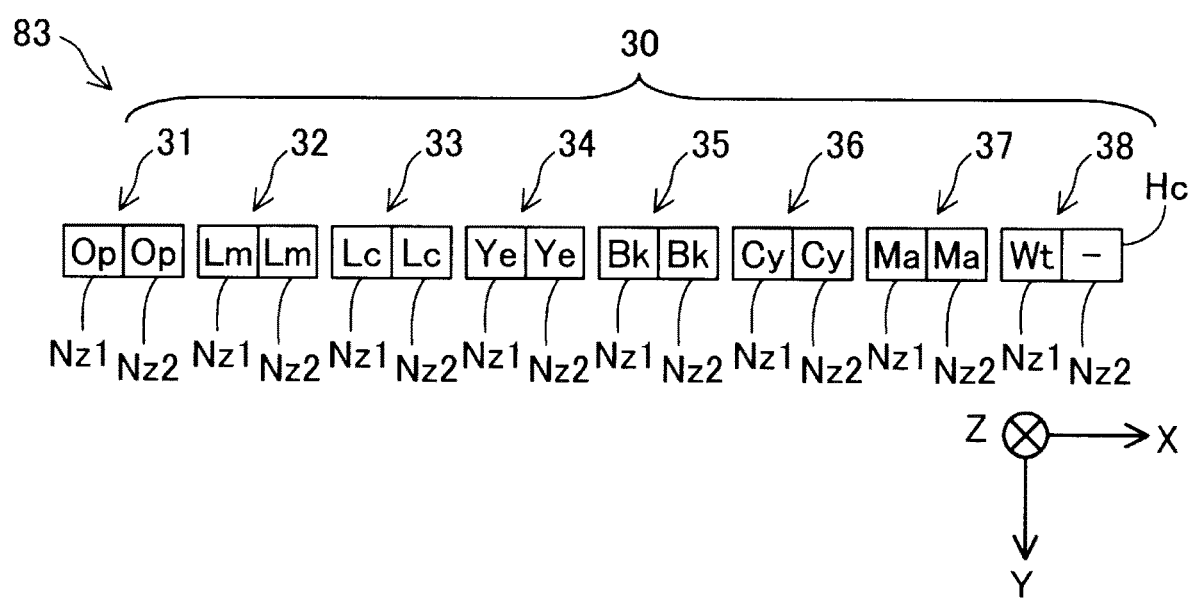
FIG. 4 is a simple explanatory diagram schematically illustrating types of ink ejected through respective nozzle rows of respective head sections.

Next, explanation follows regarding configuration of nozzles Nz provided to the liquid ejection head 83 of the present embodiment, and the type of ink ejected through each of the nozzles Nz, with reference to FIG. 2 to FIG. 4. FIG. 2 is a plan view schematically illustrating the print head set 30 provided to the liquid ejection head 83. The print head set 30 is configured by head sections 31, 32, 33, 34, 35, 36, 37, and 38. Each head section includes four head chips Hc. However, configuration may be made in which each head section includes one, or any desired number greater than one, of the head chips Hc. With the exception that the type of ink supplied differs, the following explanation regarding the head sections applies equally to each of the head sections.

FIG. 3 is an explanatory diagram illustrating configuration of a single head chip Hc. Plural nozzles Nz are arrayed in each head chip Hc. The nozzles Nz configure openings though which ink droplets are ejected. In the present embodiment, each head chip Hc includes two rows of nozzles, namely a nozzle row Nz1 and a nozzle row Nz2. The type of ink droplets ejected through the nozzle row Nz1 and the nozzle row Nz2 can be set separately for each nozzle row Nz1, Nz2. The number and arrangement of the nozzles Nz in each of the nozzle rows Nz1, Nz2 may be set as appropriate according to the resolution and so on of the printing device 100.

FIG. 4 is a simple explanatory diagram schematically illustrating types of ink ejected through the respective nozzle rows Nz1, Nz2 of each of the head sections 31, 32, 33, 34, 35, 36, 37, and 38 of the liquid ejection head 83 of the present embodiment. Different types of ink are supplied to the respective nozzle rows Nz1, Nz2 of each of the head sections 31, 32, 33, 34, 35, 36, 37, and 38 of the print head set 30. More specifically, setting is made such that transparent ink Op is ejected through the respective nozzle rows Nz1, Nz2 of the head section 31, light magenta ink Lm is ejected through the respective nozzle rows Nz1, Nz2 of the head section 32, light cyan ink Lc is ejected through the respective nozzle rows Nz1, Nz2 of the head section 33, yellow ink Ye is ejected through the respective nozzle rows Nz1, Nz2 of the head section 34, black ink Bk is ejected through the respective nozzle rows Nz1, Nz2 of the head section 35, cyan ink Cy is ejected through the respective nozzle rows Nz1, Nz2 of the head section 36, and magenta ink Ma is ejected through the respective nozzle rows Nz1, Nz2 of the head section 37. For the head section 38, setting is made such that white ink Wt is ejected through the nozzle row Nz1, but ink is not ejected through the nozzle row Nz2. In the present embodiment, based on a drive signal COM generated by a drive signal generation section 12, a drive section 42, described later, is controlled such that there is no supply to an ejection section 46 corresponding to the nozzle row Nz2 of the head section 38, such that no ejection takes place through the nozzle row Nz2 of the head section 38. Ejection may be prevented by not supplying ink to the nozzle row Nz2. When three or more nozzle rows are present, configuration should be made such that white ink Wt is ejected through only one of these nozzle rows.

In the present embodiment, the head section 38 is employed in the first mode in which ink is ejected onto the recording medium Pt to form the undercoat layer. More specifically, as illustrated in FIG. 4, in the first mode, the white ink Wt is ejected through the nozzle row Nz1 of the head section 38 to form the undercoat layer on the recording medium Pt. In the second mode in which an image is formed on the surface of the undercoat layer, image-forming ink is ejected through the respective nozzle rows Nz1, Nz2 of each of the head sections 32, 33, 34, 35, 36, and 37. The transparent ink Op in the head section 31 may also be employed in the second mode, and the transparent ink Op may be ejected after forming the undercoat layer with the white ink Wt in the first mode, either before or after forming an image in the second mode. The white ink Wt may also be employed in addition to the image-forming inks and the transparent ink Op in the image formation of the second mode.

Explanation follows regarding composition of the inks employed in the liquid ejection head 83 of the present embodiment. Ink compositions include ink compositions containing inorganic pigment, ink compositions containing colorants other than inorganic pigment, and the like. The ink composition is configured by colorants such as inorganic pigments, organic pigments, or dyes, a solvent such as water or an organic solvent, resins, surfactants, and the like. The composition of the white ink Wt preferably includes at least one type of white colorant selected from the group consisting of metallic compounds and hollow resin particles, and a resin component to make the colorant adhere.

Examples of metallic compounds employed in the white ink Wt include metallic oxides, barium sulfate, and calcium carbonate that have traditionally been employed as white pigments. Examples of metallic oxides include titanium dioxide, zinc oxide, silica, alumina, and magnesium oxide.

Titanium dioxide or alumina is preferably employed as the metallic compound, with titanium dioxide being employed in the present embodiment. The white color pigment should have an average particle diameter of at least 200 nm and should be contained at a concentration of at least 7 percent by mass. The white color pigment preferably has an average particle diameter of from 200 nm to 400 nm, and is preferably contained at a concentration of from 7 percent by mass to 15 percent by mass with respect to the total mass of the composition. The average particle diameter and concentration of the white color pigment may be set as appropriate within the above ranges based on the nozzle diameter, the size of the ejected droplets, and the required density of the white color in the undercoat layer.

The average particle diameter may be measured using a particle size distribution measurement instrument employing a measurement principle based on a laser diffraction and scattering method. For example, a particle size distribution analyzer (such as a Microtrac UPA manufactured by MicrotracBEL Corp.) employing a measurement principle based on a dynamic light scattering method may be employed as a laser diffraction-type particle size distribution measurement instrument.

Explanation follows regarding composition of the image-forming inks used in the second mode to form a color image. The composition of each image-forming ink should include a colorant corresponding to the respective color, namely cyan (Cy), magenta (Ma), yellow (Ye), black (Bk), light cyan (Lc), or light magenta (Lm), and is a composition of colored ink of a color other than white. Inorganic pigment contained in the image-forming ink should have an average particle diameter of less than 200 nm and should be contained at less than 7 percent by mass. The inorganic pigment contained in the image-forming ink preferably has an average particle diameter of from 20 nm to less than 200 nm, and is preferably contained at a concentration of from 1 percent by mass to less than 7 percent by mass with respect to the total mass of the composition. Examples of inorganic pigments include: carbon black; elemental metals such as gold, silver, copper, aluminum, nickel, and zinc; oxides such as cerium oxide, chromium oxide, aluminum oxide, zinc oxide, magnesium oxide, silicon oxide, tin oxide, zirconium oxide, iron oxide, and titanium oxide; sulfates such as calcium sulfate, barium sulfate, and aluminum sulfate; silicates such as calcium silicate and magnesium silicate; nitrides such as boron nitride and titanium nitride; carbides such as silicon carbide, titanium carbide, boron carbide, tungsten carbide, and zirconium carbide; and borides such as zirconium boride and titanium boride. Carbon black is employed as an inorganic pigment in the black ink of the present embodiment.

Figure 5:
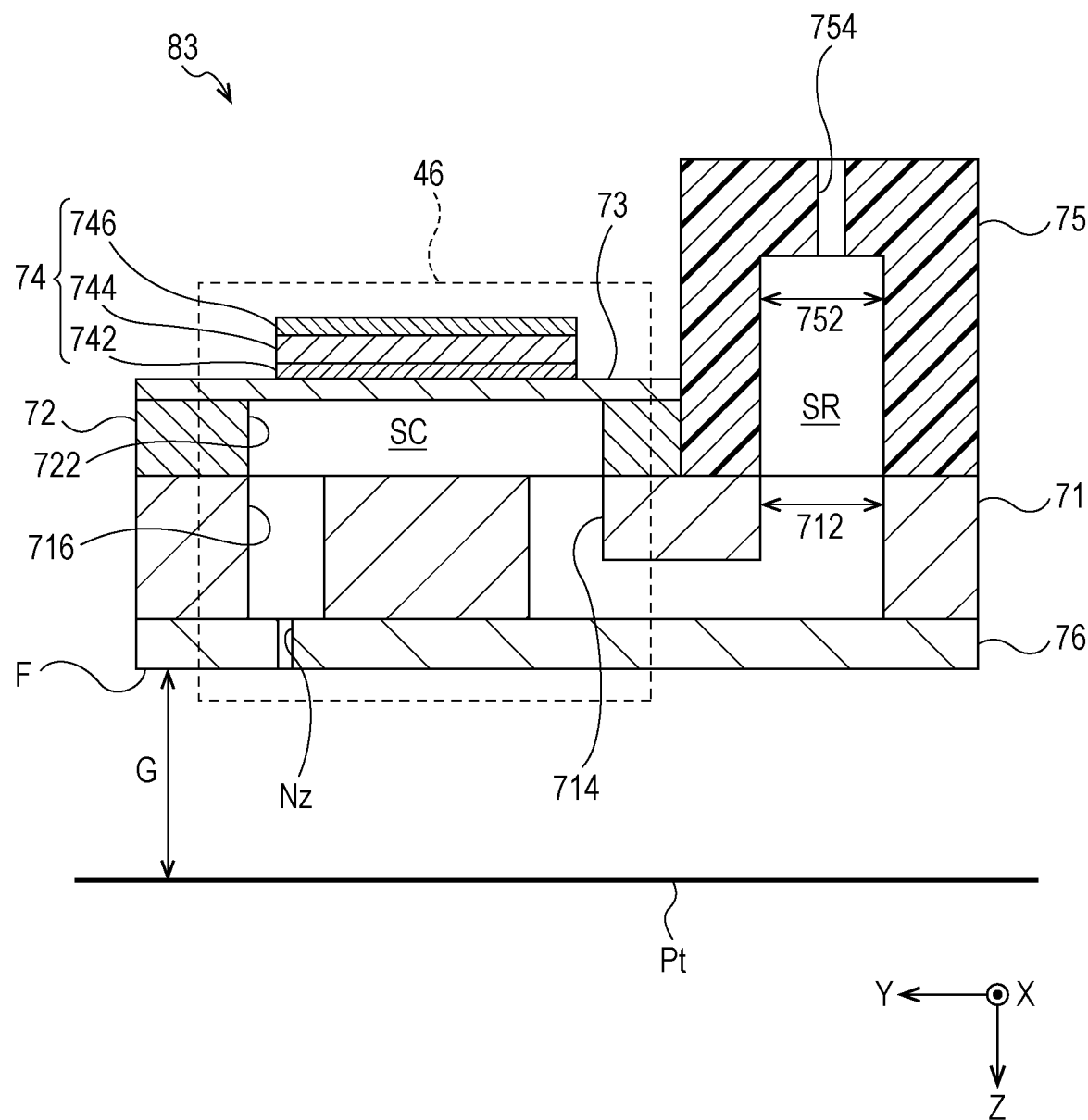
FIG. 5 is a cross-section illustrating a single nozzle and the vicinity thereof in a liquid ejection head.

Explanation follows regarding configuration of ink droplet ejection by the liquid ejection head 83 of the present embodiment, with reference to FIG. 5 to FIG. 8. FIG. 5 is a cross-section illustrating a single nozzle Nz and the vicinity thereof in the liquid ejection head 83. The liquid ejection head 83 is configured by a pressure chamber substrate 72, a vibration plate 73, piezoelectric elements 74, and a support body 75 disposed on one surface side of a flow path substrate 71, and a nozzle plate 76 disposed on another surface side of the flow path substrate 71. The flow path substrate 71, the pressure chamber substrate 72, and the nozzle plate 76 are each formed as silicon substrates, and the support body 75 is formed by injection molding a resin material. A surface of the nozzle plate 76 on the opposite side to the flow path substrate 71 corresponds to an ink ejection face F. The ink ejection face F and the surface of the recording medium Pt face each other across a gap G.

The flow path substrate 71 includes a common flow path 712, branched flow paths 714, and communication flow paths 716. The branched flow paths 714 and the communication flow paths 716 are individual flow paths formed for each of the respective nozzles Nz, whereas the common flow path 712 is a trench common to all of the individual flow paths. A space where a housing section 752 formed in the support body 75 and the common flow path 712 of the flow path substrate 71 are in communication with each other functions as a common liquid chamber (reservoir) SR where ink supplied from the ink cartridge 82 through an introduction flow path 754 is collected.

An opening 722 configuring part of each of the individual flow paths is formed in the pressure chamber substrate 72 corresponding to each of the nozzles Nz. The vibration plate 73 is a flat plate member capable of elastic deformation, and is installed to a surface of the pressure chamber substrate 72 on the opposite side to the flow path substrate 71. A space within each opening 722 interposed between the vibration plate 73 and the flow path substrate 71 functions as a pressure chamber (cavity) SC which fills with ink supplied from the common liquid-pooling chamber SR through the corresponding branched flow path 714. The pressure chambers SC are in communication with the respective nozzles Nz through the communication flow paths 716 in the flow path substrate 71.

The piezoelectric element 74 of each of the nozzles Nz is formed on a surface of the vibration plate 73 on the opposite side to the pressure chamber substrate 72. The piezoelectric element 74 is a drive element including a piezoelectric body 744 between a first electrode 742 and a second electrode 746. A single ejection section 46 is configured by the piezoelectric element 74, the vibration plate 73, the pressure chamber SC, and the nozzle Nz. A drive signal, this being an output signal from the drive section 42, is supplied to the first electrode 742 of the corresponding piezoelectric element 74, and a reference voltage is supplied to the second electrode 746. The piezoelectric element 74 deforms as a result of being supplied with the drive signal, causing the vibration plate 73 to vibrate as a result. The pressure within the pressure chamber SC fluctuates as a result, causing the ink inside the pressure chamber SC to be ejected through the nozzle Nz.

Figure 6:
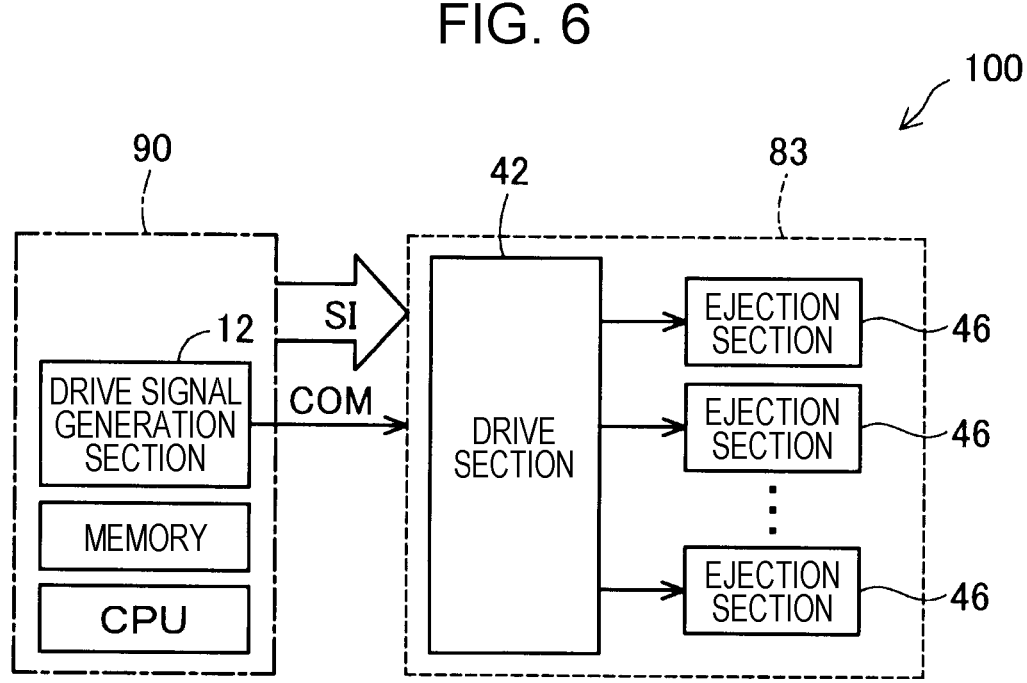
FIG. 6 is a block diagram illustrating a liquid ejection mechanism of a printing device.

FIG. 6 is a block diagram illustrating a liquid ejection mechanism of the printing device 100. The liquid ejection head 83 includes the plural ejection sections 46 corresponding to the respective nozzles Nz, and the drive section 42 that selectively supplies a drive signal COM generated by the drive signal generation section 12 to the corresponding ejection sections 46 in response to a print signal SI. The control section 90 supplies the print signal SI to the drive section 42 to instruct ink ejection so as to switch each nozzle Nz ON or OFF according to the content of a print image. The CPU reads a program from the memory to cause the control section 90 to function as the drive signal generation section 12 that generates the drive signal COM. The drive signal COM includes pulse signals that cause the liquid ejection head 83 to eject ink. The drive signal generation section 12 supplies the drive signal COM generated by the drive signal generation section 12 to the drive section 42. Out of the ejection sections 46, the drive section 42 supplies a pulse signal included in the drive signal COM to ejection sections 46 instructed to eject by the print signal SI so as to drive these ejection sections 46. These ejection sections 46 eject ink according to the pulse signal supplied from the drive section 42.

Figure 7:
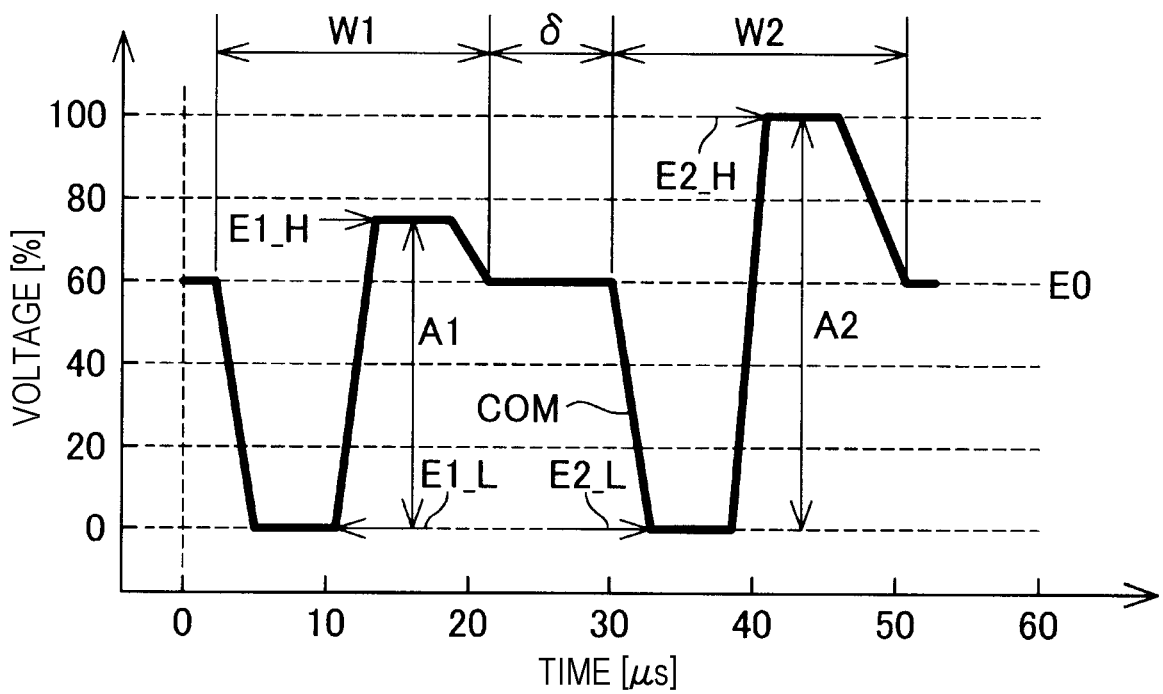
FIG. 7 is a graph illustrating changes in voltage of a drive signal.

Next, explanation follows regarding ink ejection control by the liquid ejection head 83 of the present embodiment, with reference to FIG. 6 and FIG. 7. FIG. 7 is a graph illustrating changes in the voltage of the drive signal COM. In FIG. 7, the vertical axis represents the voltage of the drive signal COM, where a minimum value (E1_L, E2_L) is 0 percent, and a maximum value (E2_H) is 100 percent. The voltage E0 in FIG. 7 is a reference voltage serving as a reference for the voltage of the drive signal COM.

The drive section 42 of the present embodiment selectively supplies the drive signal COM including a drive pulse W1 and a drive pulse W2 generated by the drive signal generation section 12 to the ejection sections 46. The drive pulse W1 and/or the drive pulse W2 of the drive signal COM are supplied to the ejection sections 46 such that ink is ejected through the nozzles Nz of these ejection sections 46. As previously described, the drive signal COM is a voltage signal including the drive pulse W1 and the drive pulse W2 that cause the liquid ejection head 83 to eject ink. The drive signal COM includes the drive pulse W1 and the drive pulse W2 one after the other on a predetermined time cycle. The drive pulse W1 and the drive pulse W2 are both pulse signals for ejecting ink. In the present embodiment, the drive pulse W1 is a waveform for forming a small dot on the recording medium Pt, the drive pulse W2 is a waveform for forming a medium-sized dot on the recording medium Pt, and the drive pulse W1 and the drive pulse W2 form a large dot on the recording medium Pt when employed in coordination with each other.

In the drive pulse W1, the voltage is lowered from the reference voltage E0 to a voltage E1_L and is maintained thereat. The voltage of the drive pulse W1 is then raised from the voltage E1_L to a voltage E1_H that is higher than the reference voltage E0 but lower than the maximum value, and then lowered to the reference voltage E0.

The drive pulse W2 is a pulse that follows directly after the drive pulse W1. Specifically, the drive pulse W2 starts at a point in time when a duration δ such as 10 μs has elapsed since the end of the drive pulse W1. In the drive pulse W2, the voltage is lowered from the reference voltage E0 to the voltage E2_L, then raised to the maximum value voltage E2_H before being lowered to the reference voltage E0. In the present embodiment, the voltage E1_L of the drive pulse W1 and the voltage E2_L of the drive pulse W2 are the same voltage as each other, whereas the voltage E2_H of the drive pulse W2 is higher than the voltage E1_H of the drive pulse W1. Namely, an amplitude A2 of the drive pulse W2 is greater than an amplitude A1 of the drive pulse W1. The waveforms of the drive pulse W1 and the drive pulse W2 may be modified as appropriate.

Figure 8:
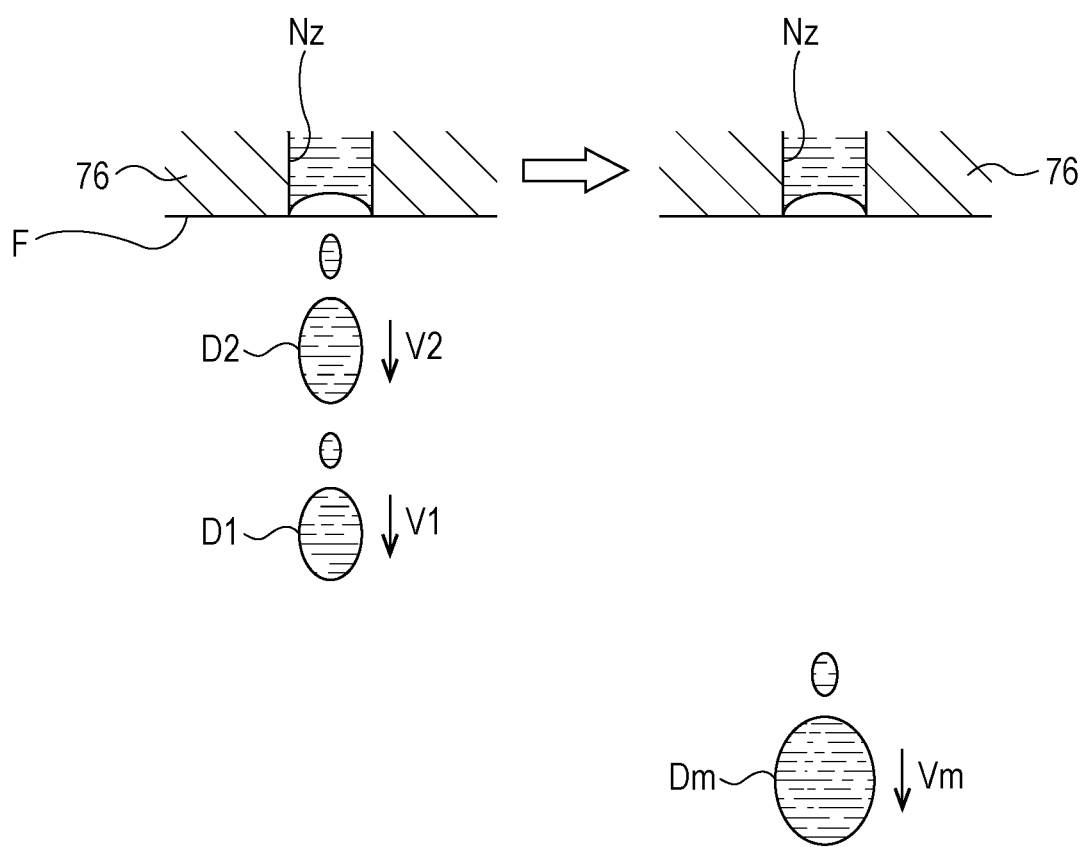
FIG. 8 is an explanatory diagram illustrating states of ink ejected through a nozzle.

Next, explanation follows regarding an ink droplet ejection method by the liquid ejection head 83 of the present embodiment, with reference to FIG. 7 and FIG. 8. FIG. 8 is an explanatory diagram illustrating states of ink ejected through a nozzle Nz. When the drive pulse W1 of the drive signal COM illustrated in FIG. 7 is supplied to a piezoelectric element 74, a first ink droplet D1 is ejected through the nozzle Nz. The drive pulse W2 is then supplied to the piezoelectric element 74 directly afterward such that a second ink droplet D2 is ejected through the nozzle Nz. Namely, the first ink droplet D1 and the separate second ink droplet D2 are ejected through a single nozzle Nz individually at different timings. The different timings are set so as to enable the second ink droplet D2 to catch up with the first ink droplet D1 as the ejected first ink droplet D1 proceeds across the gap G.

Since the amplitude A2 of the drive pulse W2 exceeds the amplitude A1 of the drive pulse W1, a velocity V2 of the second ink droplet D2 exceeds a velocity V1 of the first ink droplet D1 ejected through the nozzle Nz. Thus, as illustrated in FIG. 8, the second ink droplet D2 catches up with the first ink droplet D1 before the first ink droplet D1 and the second ink droplet D2 land on the surface of the recording medium Pt, and the first ink droplet D1 and the second ink droplet D2 merge with each other in the space between the ink ejection face F and the recording medium Pt. After merging, an ink droplet Dm proceeds at a velocity Vm related to the velocity V1 and the velocity V2 before landing on the surface of the recording medium Pt. In this manner, in the liquid ejection head 83 of the present embodiment, the drive section 42 is controlled such that the first ink droplet D1 ejected through a nozzle Nz and the second ink droplet D2 ejected through the nozzle Nz after ejection of the first ink droplet D1 merge with each other prior to landing on the recording medium Pt. The second ink droplet D2 may be made to proceed at a faster velocity V2 than that of the first ink droplet D1 by varying the abruptness with which the voltages change in the drive pulse W1 and the drive pulse W2. The time δ may also be adjusted such that the velocity V2 of the second ink droplet D2 exceeds the velocity V1 of the first ink droplet D1. The liquid ejection head 83 may be configured so as to enable the size of the ejected droplets to be selected from out of three types, these being small, medium, or large, under the control of the drive section 42. Such a configuration enables four gradations to be realized, including a state in which a dot is not formed, and small, medium, or large states of the dot size of a single pixel are expressed in two bits.

Figure 9:
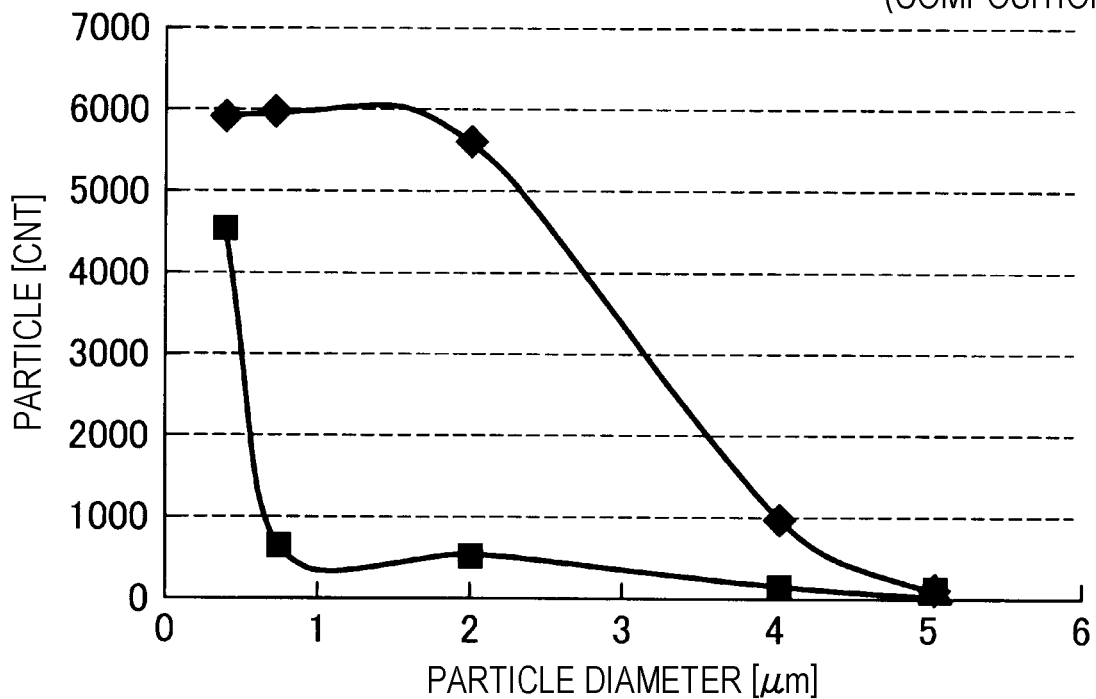
FIG. 9 is a graph illustrating measured ink mist amounts for respective ink compositions.

Explanation follows regarding composition of the ink employed in the liquid ejection head 83 of the present embodiment, with reference to FIG. 9. FIG. 9 is a graph illustrating measured ink mist amounts for respective ink compositions. More specifically, in FIG. 9, the horizontal axis represents ink particle diameter and the vertical axis represents the number of particles. FIG. 9 illustrates results of the number of particles measured for each particle diameter. The ink mist in the gap G between the ink ejection face F of the liquid ejection head 83 and the surface of the recording medium Pt was measured using a particle counter after ejection of each ink.

The ink type of composition A illustrated in FIG. 9 corresponds to the white ink Wt of the present embodiment. The composition A is a composition in which pigment with an average particle diameter of at least 200 nm is contained at a concentration of at least 7 percent by mass. The ink type is not limited to the white ink Wt, and similar results would be obtained for an image-forming ink with the composition A. The ink of composition B illustrated in FIG. 9 is magenta ink Ma, serving as an example of the image-forming ink. The composition B is a composition in which pigment with an average particle diameter of less than 200 nm is contained at a concentration of less than 7 percent by mass. The ink type is not limited to magenta ink Ma, and other types of image-forming ink may be applied. There is also no limitation to image-forming ink, and similar results would be obtained for a white ink Wt with the composition B.

As illustrated in FIG. 9, the ink mist amount from the white ink Wt with the composition A is greater than the ink mist amount from the magenta ink Ma. This is thought to be because pigment is more likely to scatter in the air the larger the particle diameter, and the ink mist is more likely to adhere the larger the large surface area of the pigment. Thus, setting the composition of ejected ink to the composition B such that pigment with an average particle diameter of less than 200 nm is contained at a concentration of less than 7 percent by mass enables the ink mist amount to be reduced. However, when ink containing a pigment with an average particle diameter of 200 nm or greater is contained at a concentration of at least 7 percent by mass (corresponding to the white ink Wt in the present embodiment), the amount of ink mist occurring increases.

Figure 10:
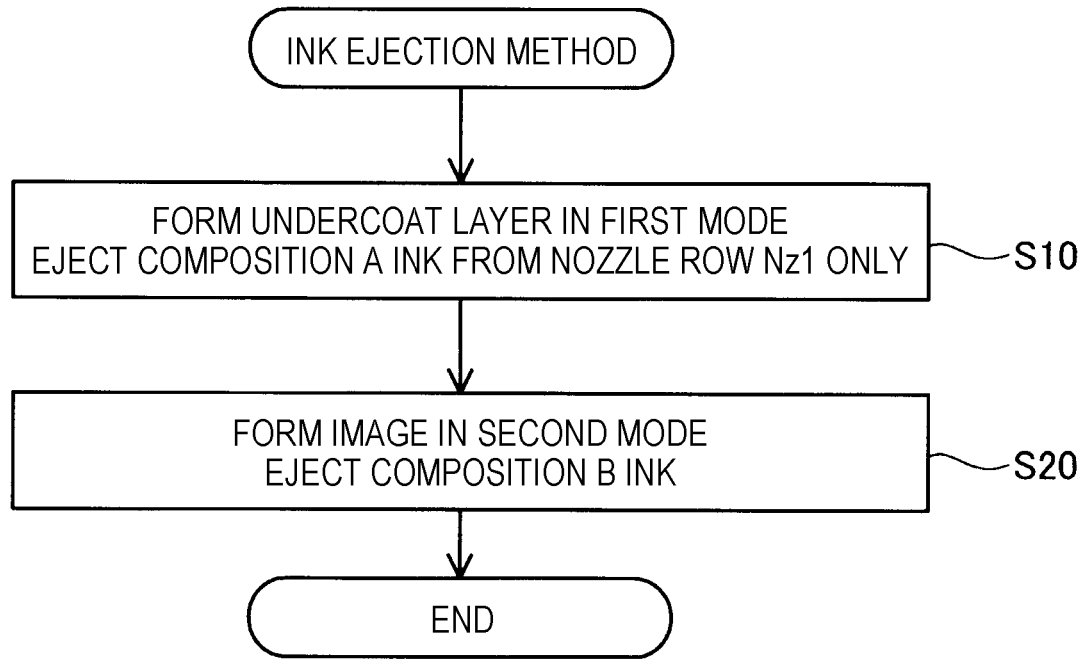
FIG. 10 is a flowchart illustrating an ink ejection method by a liquid ejection head.

Next, explanation follows regarding an ink ejection method using the liquid ejection head 83 of the present embodiment. FIG. 10 is a flowchart illustrating the ink ejection method by the liquid ejection head 83. The ink ejection method of the present embodiment is for example started by pressing a print start button of the printing device 100 that has been set to execute the first mode and the second mode.

At step S10, the liquid ejection head 83 of the printing device 100 forms the undercoat layer on the recording medium Pt in the first mode. More specifically, a drive signal COM generated by the drive signal generation section 12 and a print signal SI corresponding to the undercoat layer formation are transmitted from the control section 90 to the drive section 42, the drive section 42 supplies the drive pulse W1 and the drive pulse W2 of the drive signal COM to ejection sections 46 in response to the print signal SI, and these ejection sections 46 of the head section 38 of the liquid ejection head 83 are driven to eject the white ink Wt. As illustrated in FIG. 4, in the first mode, the white ink Wt is only ejected through the nozzle row Nz1 of the head section 38 of the liquid ejection head 83 of the present embodiment. The composition of the white ink Wt is a composition containing white pigment with an average particle diameter of at least 200 nm at a concentration of at least 7 percent by mass. The type of ink employed in the first mode is also referred to as an undercoat-forming liquid, the pigment corresponding to the ink type employed in the first mode is also referred to as an undercoat-forming pigment, and the head section employed in the first mode is also referred to as a first head section. The drive signal COM transmitted to the head section 38 employs the respective drive pulses W1, W2 illustrated in FIG. 7 when this is performed. Thus, each first ink droplet D1 and the corresponding second ink droplet D2 of the white ink Wt merge in the space in the gap G between the ink ejection face F and the recording medium Pt.

After formation of the undercoat layer on the recording medium Pt in the first mode has been completed, at step S20, the liquid ejection head 83 of the printing device 100 forms an image on the surface of the undercoat layer using the second mode. More specifically, a drive signal COM generated by the drive signal generation section 12 and a print signal SI corresponding to image formation are transmitted from the control section 90 to the drive section 42, the drive section 42 selectively transmits the drive pulse W1 and/or the drive pulse W2 of the drive signal COM according to the print signal SI to ejection sections 46 of the respective head sections 32, 33, 34, 35, 36, and 37 corresponding to the image-forming inks, and these ejection sections 46 of the respective head sections 32, 33, 34, 35, 36, and 37 of the liquid ejection head 83 are driven to eject the image-forming inks. As illustrated in FIG. 4, in the second mode, the liquid ejection head 83 of the present embodiment ejects the image-forming inks through the nozzle rows Nz1, Nz2 of the respective head sections. The composition of each image-forming ink is a composition containing pigment with an average particle diameter of less than 200 nm at a concentration of less than 7 percent by mass. The type of ink employed in the second mode is also referred to as image-forming liquid, the pigment corresponding to the ink type employed in the second mode is also referred to as image-forming pigment, and the head sections employed in the second mode are also referred to as second head sections. Configuration may be such that either one of the nozzle rows Nz1, Nz2 is driven in the second mode. The present flow is ended when image formation of the second mode has been completed.

As described above, in the liquid ejection head 83 of the present embodiment, the white ink Wt employed in the first mode is only ejected through the nozzle row Nz1 out of the nozzle rows Nz1, Nz2 of the head section 38. As described above, since the white ink Wt pigment has an average particle diameter of at least 200 nm contained at a concentration of at least 7 percent by mass, a large amount of ink mist tends to occur. If for example a large amount of ink droplets were to be simultaneously ejected through plural nozzle rows in order to form the undercoat layer, a phenomenon might arise in which an airflow occurs in the vicinity of an ink droplet ejection route in the gap G between the ink ejection face F and the recording medium Pt due to the energy with which the ink droplets are ejected, resulting in the ink mist being swept up by this airflow. This phenomenon is sometimes referred to as self-induced jetting. Self-induced jetting tends to be more pronounced the shorter the distance between ejection routes of simultaneously ejected ink droplets. In the liquid ejection head 83 of the present embodiment, the effect of self-induced jetting is reduced by only using the nozzle row Nz1 out of the plural nozzle rows Nz1, Nz2 included in the head section 38 as a nozzle row for supplying the white ink Wt. This enables the undercoat layer to be formed in the first mode in a state in which the amount of ink mist occurring is reduced, and enables the image to be formed on the undercoat layer in the second mode.

In the liquid ejection head 83 of the present embodiment, the drive pulse W1 and the drive pulse W2 of the drive signal COM are supplied to the ejection sections 46 of the head section 38 in the first mode. Thus, each first ink droplet D1 and the corresponding second ink droplet D2 of the white ink Wt merge with each other. Ink mist trailing from the first ink droplet D1 merges with the first ink droplet D1 together with the second ink droplet D2 following on from behind. This enables the amount of ink mist occurring to be further reduced.

B. Second Embodiment

Figure 11:
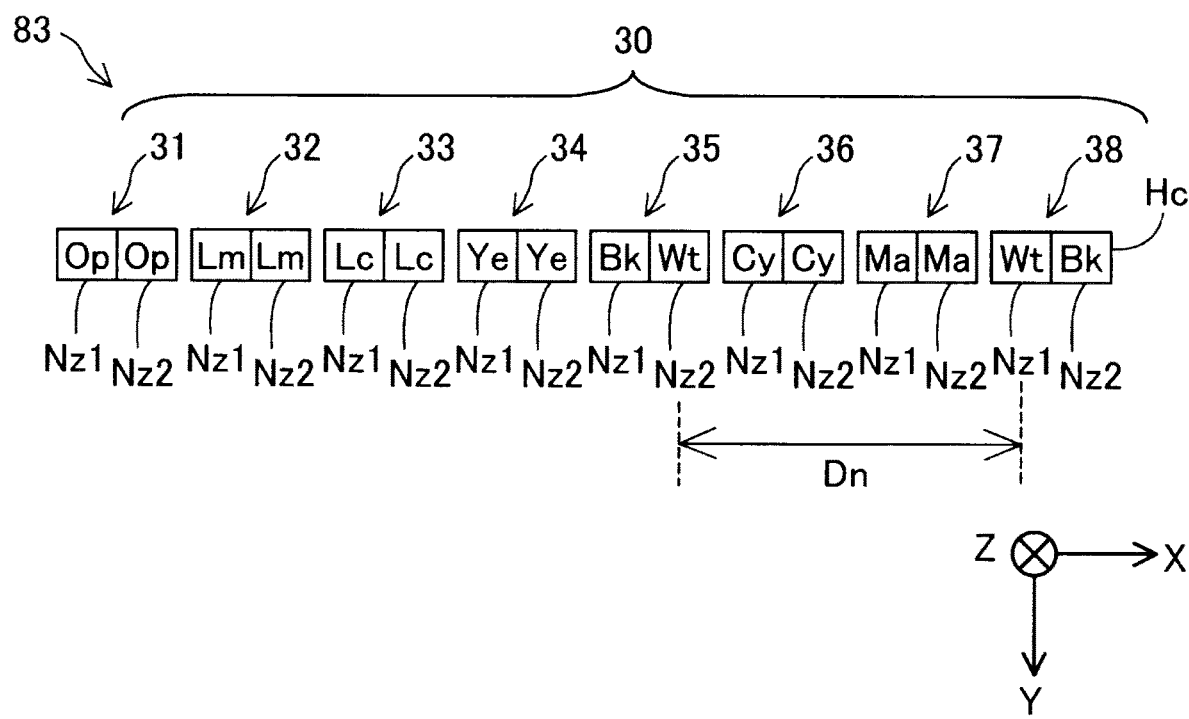
FIG. 11 is a simple explanatory diagram schematically illustrating types of ink ejected through respective nozzle rows of respective head sections of a liquid ejection head of a second embodiment.

FIG. 11 is a simple explanatory diagram schematically illustrating types of ink ejected through respective nozzle rows Nz1, Nz2 of head sections 31, 32, 33, 34, 35, 36, 37, and 38 of a liquid ejection head 83 of a second embodiment. Configuration of the liquid ejection head 83 of the second embodiment differs from the liquid ejection head 83 of the first embodiment in that the different types of ink are supplied to the respective nozzle rows Nz1, Nz2 of the head section 35 and the head section 38, and in that different head sections are driven in the first mode and the second mode. Other configuration is similar to that of the liquid ejection head 83 of the first embodiment.

Specific explanation follows regarding the respective head sections driven by the liquid ejection head 83 of the second embodiment, and the ink types supplied to the respective head sections. In the liquid ejection head 83 of the present embodiment, the white ink Wt is supplied to the nozzle row Nz1 of the head section 38 similarly to in the first embodiment, in addition to which the white ink Wt is also supplied to the nozzle row Nz2 of the head section 35.

In the undercoat layer formation of the first mode, the white ink Wt is ejected through the nozzle row Nz2 of the head section 35 in addition to the nozzle row Nz1 of the head section 38. Namely, in the liquid ejection head 83 of the present embodiment, the white ink Wt is ejected through two nozzle rows, unlike in the first embodiment. The composition of the white ink Wt supplied to the respective head sections 35, 38 is a composition containing pigment with an average particle diameter of at least 200 nm at a concentration of at least 7 percent by mass, similarly to in the first embodiment. In the present embodiment, the head section 35 is also referred to as a third head section. It is sufficient that the third head section be a different head section to the first head section, and the third head section may also be employed in image formation in the second mode.

In the respective head sections 35, 38 of the liquid ejection head 83 of the present embodiment, the black ink Bk is supplied to the nozzle row Nz1 of the head section 35 and the black ink Bk is also supplied to the nozzle row Nz2 of the head section 38. Namely, the respective head sections 35, 38 that are supplied with the white ink Wt are also supplied with the black ink Bk at the nozzle rows other than the nozzle rows supplied with the white ink Wt. When three or more of the plural nozzle rows are provided, configuration may be made such that the white ink Wt is only supplied to one of these nozzle rows, and ink other than the white ink Wt is supplied to the other nozzle rows.

FIG. 11 illustrates a distance Dn between the nozzle row Nz1 of the head section 38 and the nozzle row Nz2 of the head section 35, both supplied with the white ink Wt. The distance Dn represents the shortest distance between the center of the nozzle Nz of the nozzle row Nz1 of the head section 38 and the center of the nozzle Nz of the nozzle row Nz2 of the head section 35 when the ink ejection face F is viewed straight on. In the present embodiment, the distance Dn is set at 15 mm or greater. Namely, a gap of at least 15 mm is provided between the nozzle row Nz1 of the first head section and the nozzle row Nz2 of the third head section on the ink ejection face F.

Next, explanation follows regarding the ink employed in image formation in the second mode. In the image formation of the second mode, image-forming ink is ejected through each of the nozzle rows Nz1, Nz2 of the respective head sections 32, 33, 34, 36, and 37, and the black ink Bk is ejected through the nozzle row Nz1 of the head section 35 serving as the third head section and through the nozzle row Nz2 of the head section 38 serving as the first head section. The black ink Bk ejected in the second mode may be ejected through either the nozzle row Nz1 of the head section 35 or the nozzle row Nz2 of the head section 38. Similarly to the other image-forming inks, the composition of the black ink Bk supplied to the respective head sections 35, 38 is a composition containing pigment with an average particle diameter of less than 200 nm at a concentration of less than 7 percent by mass.

As described above, the liquid ejection head 83 of the present embodiment ejects the white ink Wt through two nozzle rows with a gap therebetween of at least 15 mm on the ink ejection face F, thereby suppressing the effects of self-induced jetting and suppressing the occurrence of ink mist. This enables the undercoat layer to be efficiently formed by ejecting the white ink Wt through two nozzle rows in the first mode while the amount of ink mist from the white ink Wt occurring as a result of self-induced jetting is reduced.

In the liquid ejection head 83 of the present embodiment, the white ink Wt is only ejected through one of the nozzle rows of the respective head sections 35, 38, thereby suppressing the occurrence of self-induced jetting of the white ink Wt within a single head section, and thus suppressing the occurrence of ink mist. Moreover, supplying the black ink Bk to the other nozzle rows of the respective head sections 35, 38 supplied with the white ink Wt enables the occurrence of self-induced jetting of the white ink Wt to be suppressed, and both the undercoat layer and the image can be efficiently formed by utilizing the nozzle rows of the respective head sections 35, 38 other than the nozzle rows supplied with the white ink Wt.

In the liquid ejection head 83 of the present embodiment, the black ink Bk is supplied to the nozzle rows of the respective head sections 35, 38 other than the nozzle rows supplied with the white ink Wt. As described above, in the present embodiment, the black ink Bk contains carbon black as an inorganic pigment, and the white ink Wt contains titanium dioxide as a titanium oxide (TiOx). When ink containing hard components such as carbon black or titanium dioxide adheres to the ink ejection face F as a result of ink mist or the like, the ink tends to gradually agglomerate on the ink ejection face F, and components (solutes) contained in the ink gather to form clumps. Such clumps grow larger over time. When the ink ejection face F is for example wiped by a wiping mechanism in a state in which such clumps have formed, the clumps acts as an abrasive on the ink ejection face F, such that the surface of the ink ejection face F such as a liquid repellant film is more liable to be scratched. Thus, head sections supplied with ink such as white ink Wt or black ink Bk that has a greater tendency to form clumps may need to be replaced more often than the head sections supplied with other image-forming inks. In the liquid ejection head 83 of the present embodiment, the white ink Wt and black ink Bk that are likely to require more frequent replacement of the head sections are supplied to the same head sections 35, 38 as each other. In other words, supply of the black ink Bk and white ink Wt that are likely to require more frequent replacement of the head sections is consolidated in the same head sections, thereby avoiding supply of the inks that are likely to require more frequent replacement to the other head sections that eject the image-forming inks. By supplying the black ink Bk that is likely to require more frequent replacement of the head sections similarly to the white ink Wt to the other nozzle rows of the head sections 35, 38 supplied with the white ink Wt, replacement of the other head sections supplied with the image-forming inks is suppressed from becoming more frequent.

C. Other Embodiments

C1. In each of the above embodiments, the recording medium Pt is a non-white recording medium such as a plastic sheet or a thin metal sheet. However, the recording medium Pt may be configured by non-white printing paper or white printing paper. In such cases, the ink type used in the first mode should be an ink type corresponding to the recording medium Pt, and the ink composition should contain a first pigment with an average particle diameter of at least 200 nm at a concentration of at least 7 percent by mass.

C2. In each of the above embodiments, the white ink Wt is supplied to the nozzle row Nz1 of the head section 38 used in the first mode. However, an ink type other than the white ink Wt may be supplied to a nozzle row of a head section used in the first mode. In such cases, the composition of the ink supplied to the nozzle row of the head section 38 used in the first mode contains a first pigment with an average particle diameter of at least 200 nm at a concentration of at least 7 percent by mass.

C3. In the second embodiment described above, the black ink Bk is supplied to the nozzle rows of the respective head sections 35, 38 other than the nozzle rows supplied with the white ink Wt. However, the ink type supplied to the nozzle rows of the respective head sections 35, 38 other than the nozzle rows supplied with the white ink Wt may be an ink type other than the black ink Bk. For example, using ink with a color that is closer in hue, saturation and/or brightness to the white ink Wt enables the effects of color mixing during wiping to be suppressed. In such cases, the composition of the ink supplied to the nozzle rows of the respective head sections 35, 38 other than the nozzle rows supplied with the white ink Wt should be a composition containing a pigment with an average particle diameter of less than 200 nm at a concentration of less than 7 percent by mass.

D. Other Embodiments

The present disclosure is not limited to the above embodiments, and various other configurations may be implemented within a range not departing from the spirit of the present disclosure. For example, the present disclosure may also be implemented by the following aspects. Technological features in the above embodiments corresponding to technological features in the respective aspects described below may be switched or combined as appropriate in order to resolve some or all of the issues addressed by the present disclosure, or to realize some or all of the advantageous effects of the present disclosure. Moreover, technological features not described as being essential to the present specification may be omitted as appropriate.

1. A first aspect of the present disclosure provides a liquid ejection head configured to eject a liquid through nozzles. The liquid ejection head includes plural head sections each including plural nozzle rows. One of the plural nozzle rows of a first head section of the plural head sections is supplied with an undercoat-forming liquid containing an undercoat-forming pigment with an average particle diameter of at least 200 nm at a concentration of at least 7 percent by mass. Moreover, each of the plural nozzle rows of a second head section different from the first head section of the plural head sections is supplied with an image-forming liquid containing an image-forming pigment with an average particle diameter of less than 200 nm at a concentration of less than 7 percent by mass. In the liquid ejection head of this aspect, the undercoat-forming liquid that contains a first pigment with an average particle diameter of at least 200 nm and is contained at a concentration of at least 7 percent by mass, and that generates a larger amount of ink mist as a result, is only ejected from one of the plural nozzle rows of the first head section. This reduces the effects of self-induced jetting, in which an airflow occurs in the vicinity of an ink droplet ejection route due to the energy with which ink droplets are ejected, and ink mist is swept up by this airflow. This enables the undercoat layer to be formed in a state in which the amount of ink mist occurring is reduced, and enables an image to be formed on the undercoat layer.

2. In the liquid ejection head of the above aspect, configuration may be made wherein a nozzle row other than the one of the plural nozzle rows included in the first head section is supplied with an image-forming liquid containing an image-forming pigment with an average particle diameter of less than 200 nm at a concentration of less than 7 percent by mass. In the liquid ejection head of this aspect, a liquid that generates a small amount of ink mist is supplied to one of the nozzle rows of the first head section other than the nozzle row supplied with the undercoat-forming liquid. This enables liquid to be efficiently ejected by utilizing one of the nozzle rows of the first head section other than the one nozzle row supplied with the undercoat-forming liquid while the amount of ink mist occurring is reduced.

3. In the liquid ejection head of the above aspect, configuration may be made wherein the undercoat-forming liquid is a white ink, and the image-forming liquid supplied to the nozzle row other than the one nozzle row of the first head section is a black ink. The liquid ejection head of this aspect supplies both white ink and black ink, these being likely to require more frequent replacement of the head section, to the same head section. This enables replacement of the other head sections that are supplied with image-forming inks other than the white ink and the black ink to be suppressed from becoming more frequent while the amount of ink mist occurring due to self-induced jetting of the white ink is reduced.

4. In the liquid ejection head of the above aspect, configuration may be made wherein a third head section that is different from the first head section of the plural head sections includes one of the plural nozzle rows being supplied with an undercoat-forming liquid containing an undercoat-forming pigment with an average particle diameter of at least 200 nm at a concentration of at least 7 percent by mass. Moreover, a gap of at least 15 mm is provided between the one nozzle row of the first head section and the one nozzle row of the third head section. The liquid ejection head of this aspect enables the undercoat layer to be efficiently formed by ejecting the undercoat-forming liquid through two nozzle rows in the first mode while the amount of ink mist occurring due to self-induced jetting of the undercoat-forming liquid is reduced.

5. In the liquid ejection head of the above aspect, configuration may be made wherein a nozzle row other than the one of the plural nozzle rows included in the third head section is supplied with an image-forming liquid containing an image-forming pigment with an average particle diameter of less than 200 nm at a concentration of less than 7 percent by mass. In the liquid ejection head of this aspect, a liquid that generates a smaller amount of ink mist is supplied to the nozzle row other than the one of the plural nozzle rows of the third head section that is supplied with the undercoat-forming liquid. This enables liquid to be efficiently ejected by utilizing a nozzle row other than the one nozzle row of the third head section while the amount of ink mist occurring is reduced.

6. In the liquid ejection head of the above aspect, configuration may be made wherein the undercoat-forming liquid supplied to the one nozzle row of the third head section is a white ink, and the image-forming liquid supplied to the nozzle row other than the one nozzle row of the third head section is a black ink. In the liquid ejection head of this aspect, the white ink and the black ink that are likely to require more frequent replacement of the head section are both supplied to the third head section. This enables replacement of the other head sections supplied with the image-forming inks other than the white ink and the black ink to be suppressed from becoming more frequent by utilizing the nozzle rows of the third head section while the amount of ink mist occurring due to self-induced jetting of the white ink is reduced.

7. In the liquid ejection head of the above aspect, configuration may be made wherein each of the plural head sections includes an ejection section configured to change a pressure of an individual pressure chamber so as to eject the liquid through the nozzle. Each ejection section may be configured to cause a first droplet of the liquid as ejected through the respective nozzle rows of the plural head sections to merge with a second droplet of the liquid ejected through the nozzle row that ejected the first droplet after ejection of the first droplet, prior to landing on a recording medium. In the liquid ejection head of this aspect, the second droplet of the liquid ejected after ejection of the first droplet of the liquid is caused to merge prior to landing on the recording medium. Ink mist trailing from the first droplet merges with the first droplet together with the second droplet following on from behind. This enables the amount of ink mist occurring to be further reduced.

8. Another aspect of the present disclosure provides a liquid ejection method for a liquid ejection head including plural head sections each including plural nozzle rows. The liquid ejection method includes, in a first mode for forming an undercoat at a recording medium, ejecting, by a first head section of the plural head sections, an undercoat-forming liquid containing an undercoat-forming pigment with an average particle diameter of at least 200 nm at a concentration of at least 7 percent by mass through one of the plural nozzle rows included in the first head section, and in a second mode for forming an image at the undercoat, ejecting, by a second head section different from the first head section of the plural head sections, an image-forming liquid containing an image-forming pigment with an average particle diameter of less than 200 nm at a concentration of less than 7 percent by mass through plural nozzle rows included in the second head section.

The present disclosure is not limited to application to a liquid ejection head that ejects ink, and may also be applied to any desired liquid ejection head configured to eject a liquid other than ink. For example, the present disclosure may be applied to the various types of liquid ejection heads given below. Namely, liquid ejection heads may be realized in the following formats: a colorant ejection head employed in manufacture of a color filter for an image recording device such as a fax machine or an image display device such as a liquid crystal display; an electrode material ejection head employed in electrode formation for an organic electro luminescence (EL) display, a field emission display (FED), or the like; a liquid ejection head that ejects liquid containing bioorganic material employed in biochip manufacture; a sample ejection head serving as a micropipette; a lubricant ejection head; a liquid resin ejection head; a liquid ejection head for pinpoint ejection of lubricant into precision machinery such as watches or cameras; a liquid ejection head for ejecting transparent liquid resin, such as an ultraviolet-cured liquid resin for forming a microscopic hemispherical lens (optical lens) employed in optical communication devices or the like onto a substrate; a liquid ejection head for ejecting an acidic or alkaline etching liquid for etching a substrate or the like; or a liquid ejection head for ejecting droplets of any other desired liquid in minute amounts.

What is claimed is:

1. A liquid ejection head configured to eject a liquid through nozzles, the liquid ejection head comprising:
a plurality of head sections including a first head section and a second head section, each of the plurality of head sections including a plurality of nozzle rows,
one of the plurality of nozzle rows of the first head section being supplied with an undercoat-forming liquid containing an undercoat-forming pigment with an average particle diameter of at least 200 nm at a concentration of at least 7 percent by mass, and
each of the plurality of nozzle rows of the second head section being supplied with an image-forming liquid containing an image-forming pigment with an average particle diameter of less than 200 nm at a concentration of less than 7 percent by mass.

2. The liquid ejection head according to claim 1, wherein a nozzle row other than the one of the plurality of nozzle rows included in the first head section is supplied with an image-forming liquid containing an image-forming pigment with an average particle diameter of less than 200 nm at a concentration of less than 7 percent by mass.

3. The liquid ejection head according to claim 2, wherein the undercoat-forming liquid is a white ink, and the image-forming liquid supplied to the nozzle row other than the one nozzle row of the first head section is a black ink.

4. The liquid ejection head according to claim 1, wherein the plurality of head sections includes a third head section that is different from the first head section,
one of the plurality of nozzle rows of the third head section being supplied with an undercoat-forming liquid containing an undercoat-forming pigment with an average particle diameter of at least 200 nm at a concentration of at least 7 percent by mass, and
a gap of at least 15 mm provided between the one nozzle row of the first head section and the one nozzle row of the third head section.

5. The liquid ejection head according to claim 4, wherein a nozzle row other than the one of the plurality of nozzle rows included in the third head section is supplied with an image-forming liquid containing an image-forming pigment with an average particle diameter of less than 200 nm at a concentration of less than 7 percent by mass.

6. The liquid ejection head according to claim 5, wherein the undercoat-forming liquid supplied to the one nozzle row of the third head section is a white ink, and the image-forming liquid supplied to the nozzle row other than the one nozzle row of the third head section is a black ink.

7. A liquid ejection device comprising:
the liquid ejection head according to claim 1; and
a control section configured to supply a drive signal to the liquid ejection head,
each of the plurality of head sections including at least one ejection section including one of the nozzles, a pressure chamber in communication with the nozzle, and a drive element configured to change a pressure of the liquid in the pressure chamber in response to the supplied drive signal such that the liquid is ejected through the nozzle, wherein
supplying the drive signal to the drive element causes a first droplet to be ejected through the nozzle, and after the first droplet is ejected causes a second droplet to be ejected through the nozzle that ejected the first droplet so as to cause the first droplet and the second droplet to merge with each other prior to landing on a recording medium.

8. A liquid ejection method for a liquid ejection head including a plurality of head sections including a first head section and a second head section, each of the plurality of head sections including a plurality of nozzle rows, the liquid ejection method comprising:

in a first mode for forming an undercoat at a recording medium, ejecting, by the first head section, an undercoat-forming liquid containing an undercoat-forming pigment with an average particle diameter of at least 200 nm at a concentration of at least 7 percent by mass through one of the plurality of nozzle rows included in the first head section; and in a second mode for forming an image on the undercoat, ejecting, by the second head section, an image-forming liquid containing an image-forming pigment with an average particle diameter of less than 200 nm at a concentration of less than 7 percent by mass through a plurality of nozzle rows included in the second head section.

* * * * *